United States Patent [19]

Callahan et al.

[11] Patent Number: 4,633,161
[45] Date of Patent: Dec. 30, 1986

[54] IMPROVED INDUCTORLESS PHASE CONTROL DIMMER POWER STAGE WITH SEMICONDUCTOR CONTROLLED VOLTAGE RISE TIME

[76] Inventors: Michael Callahan, 201 E. 85 St., New York, N.Y. 10024; John K. Chester, 34 Bergen St., New York, N.Y. 11201; Robert M. Goddard, 330 First Ave., New York, N.Y. 10009

[21] Appl. No.: 640,978

[22] Filed: Aug. 15, 1984

[51] Int. Cl.$^4$ .......................................... H05B 37/02
[52] U.S. Cl. ............................ 323/242; 307/252 UA; 307/582; 315/194; 323/265; 323/326
[58] Field of Search ............... 323/265, 242, 270, 325, 323/326, 268; 315/195, 199, 194, DIG. 7; 307/252 UA, 571, 583, 257 N, 253, 582

[56] References Cited

U.S. PATENT DOCUMENTS

| | | | |
|---|---|---|---|
| 3,200,327 | 8/1965 | Fleming | 323/89 |
| 3,243,653 | 3/1966 | Locklin | 315/194 |
| 3,256,463 | 6/1966 | Davis | 315/158 |
| 3,274,484 | 9/1966 | Gebhardt et al. | 323/93 |
| 3,397,344 | 8/1968 | Skirpan | 315/194 |
| 3,667,030 | 5/1972 | Gordon et al. | 323/24 |
| 3,691,404 | 9/1972 | Swygert, Jr. | 307/252 |
| 3,879,652 | 4/1975 | Billings | 307/252 UA |
| 3,898,516 | 8/1975 | Nakasone | 315/194 |
| 3,990,000 | 11/1976 | Digneffe | 323/325 |
| 4,086,526 | 4/1978 | Grüdelbach | 323/34 |
| 4,241,295 | 12/1980 | Williams, Jr. | 315/294 |
| 4,287,468 | 9/1981 | Sherman | 323/322 |
| 4,325,021 | 4/1982 | McMackin | 323/351 |
| 4,423,478 | 12/1983 | Bullock et al. | 363/89 |
| 4,438,356 | 3/1984 | Fleisher | 307/571 |
| 4,450,384 | 5/1984 | Krokaugger | 315/127 |
| 4,500,802 | 2/1985 | Janutka | 307/571 |
| 4,504,779 | 3/1985 | Haman | 323/349 |
| 4,528,494 | 7/1985 | Bloomer | 323/237 |
| 4,540,893 | 9/1985 | Bloomer | 307/248 |
| 4,547,828 | 10/1985 | Bloomer | 323/289 |

FOREIGN PATENT DOCUMENTS

56148172 11/1981 Japan .

OTHER PUBLICATIONS

42"Power Supply Aspects of Semiconductor Equipment", H. A. Gauper, Jr., J. D. Harden, Jr., A. M. McQuarrie, IEEE Spectrum (USA), vol. 8, No. 10, pp. 32–43, (Oct. 1971).

"Lamp Acoustical Noise and the Reverse Phase Controlled Dimmer", R. M. Burkhart, R. W. Burtness, 1971 Sixth Annual Meeting of the IEEE Industry and General Application Group, Cleveland, Ohio, USA, Oct. 18–21, 1971 (New York, USA: IEEE 1971) pp. 949–966.

"Lamp Acoustical Noise and the Reverse Phase Control Dimmer", R. M. Burkhart, R. W. Burtness, IEEE Trans. Ind. Appl. (USA), vol. 1A-8, No. 1, pp. 84–88, (Jan.–Feb. 1972).

"Reverse Phase Control Dimmer for Incandescent Lighting", R. M. Burkhart, D. L. Ostrodka, Industrial Applications Society IEE–IAS Annual Meeting, Toronto, Ontario, Canada, 1–5, Oct. 1978 (New York, USA: IEEE 1978) pp. 614–617.

List Continued on next page.

*Primary Examiner*—Clifford C. Shaw
*Attorney, Agent, or Firm*—Kenyon & Kenyon

[57] ABSTRACT

An electronic dimming apparatus includes a semiconductor power controller which couples a lamp to an alternating current source and variably controls the average power supplied to the lamp by adjusting the relative proportion of each half-cycle in which the power controller is in a conductive condition. The semiconductor power controller is controlled by the output of a transition controller which in turn is connected to a triggering circuit. The triggering circuit is responsive to a first input condition corresponding to desired average power and also responsive to the zero-crossing of the alternating current waveform. The transition controller gradually changes the condition state of the semiconductor power controller between non-conduction and conduction and controls the voltage across the lamp load to maintain a stable rate of voltage change despite lamp impedance variations, thus reducing electromagnetic interference.

15 Claims, 8 Drawing Figures

OTHER PUBLICATIONS

"Reverse Phase Control Dimmer for Incandescent Lighting", R. M. Burkhart, D. L. Ostrodka IEEE Trans. Ind. Appl. (USA), vol. 1A-5, No. 5, pp. 579-583, (Sep.-Oct. 1979).

"Using VMOS for Direct and Reverse Phase Control", C. F. Christiansen, M. Benedetti, Rev. Telegr. Electron. (Argentina), vol. 69, No. 819, pp. 499-503, (Jun. 1981).

"Power FET Controlled Dimmer for Incandescent Lamps", C. F. Christiansen, M. Benedetti, IEEE Trans. Ind. Appl. (USA), vol. IA-19, No. 3, pt. 1, pp. 323-327, (May-Jun. 1983).

QD ™ Series Dimmer Brochure, Electro Controls, Salt Lake City, Utah, Lightboard XP/DC90 Dimmer Brochure, Strand Lighting, Rancho Dominguez, Calif.

"Bright New World", M. Callahan, Lighting Dimensions, vol. VIII, No. 3, Jun. 1983, pp. 35-42.

IMPROVED INDUCTORLESS PHASE CONTROL DIMMER POWER STAGE WITH SEMICONDUCTOR CONTROLLED VOLTAGE RISE TIME

RELATED DISCLOSURES

This application relates to lighting control and, more specifically, to an improved power stage for electronic dimmers and arises out of inventive disclosures filed as:
Disclosure Document No. 111227, received Aug. 16, 1982
Disclosure Document No. 115261, received Mar. 1, 1983

BACKGROUND OF THE INVENTION

No single development in the history of luminaire intensity control for the performing arts has had the impact of the silicon controlled rectifier in the form of the phase control dimmer. Such dimmers made true low voltage remote control of lamp loads practical, and with it, the mastering, presetting, and memory capabilities at the heart of modern control systems. The impact of the solid state dimmer extended beyond performance lighting to embrace the control of architectural lighting as well.

However, in the quarter century since the introduction of the solid state electronic dimmer and despite considerable variation in the design of the triggering circuit, the power stage of such dimmers has remained unchanged.

The power stage of all professional electronic dimmers consists of a pair of silicon controlled rectifiers (or a triac) and a magnetic inductor or "choke".

Refer now to FIG. 1 where the output half-cycle waveform typical of such a prior art power stage at approximately half intensity is illustrated. Line 101 indicates the AC input waveform. Line 102 illustrates the response of the thyristor itself. The thyristor turns on in approximately one microsecond, producing a step voltage transition equal to the instantaneous line voltage (and, in the case of triggering 90° after the zero crossing, producing a step voltage transition with a value equal to the peak voltage of the AC line). This voltage step produces a large current step in the attached load. The combined effect is a burst of electromagnetic energy rich in harmonics from audio frequencies all the way into the commercial radio frequencies. The low frequency component of the EMI noise spectrum propagates through the power wiring towards the load, while the high frequency components propagate towards both supply and load as well as radiating from the conductors themselves. The resulting electromagnetic interference has a variety of undesirable effects on other electronic equipment, notably sound amplification, radio, and video equipment, the precise nature and severity of those effects determined by a complex mix of variables.

This pulse also produces a magnetostrictive contraction of the connected lamp filament inducing vibration which causes audible noise and decreases lamp life.

For this reason, the power stage of prior art electronic dimmers incorporates a magnetic inductor or "choke" to reduce the rate of current change, increasing the voltage rise time. Increasing rise time decreases both the total EMI power generated and attenuates the higher frequencies.

For any given choke design it is axiomatic that the longer the rise time and the better the EMI suppression the larger and heavier (and hence more expensive) the choke. Dashed line 103 indicates the effect of adding the inductor to the circuit. Shaded area 104 represents energy stored in the choke not all of which is returned to the circuit.

However, as a choke controls only the rate of current change, the voltage rise and hence noise spectrum is highly load dependent.

Further, as the choke does not affect the rate of thyristor turn on, there is still a step voltage transition present in the conductor between the thyristor and choke. Although this transition does not reach the load, it results in radiated interference, particularly if the choke has been mounted remotely from the thyristor to ease mechanical design problems.

Finally, an ideal choke would provide increasing attenuation with frequency. However, the chokes employed in most prior art dimmer designs have, due to cost considerations, had fairly high shunt capacitance and/or types of core materials which result in significantly less than ideal high frequency attenuation.

In sum, because the addition of a choke to prior art dimmer power stages has no effect on the step voltage transition of the power device, an EMI noise spectrum far greater than that predicted from the circuit's rise time will result. Depending upon the quality, some portion of the low frequency component will also reach the load. High frequency components will propagate towards the supply, and radiate from the conductor between the power device and the choke.

Due to several trends in dimmer application and in component costs, an electronic dimmer power stage producing modest EMI without the need for a large inductor has become highly desirable.

One such trend is the steady increase in the cost of chokes as a result of rising raw material and labor costs (in contrast to a decrease in the cost of a dimmer's active components). Because similar inductors are seldom employed by industry at large, no significant improvements in cost or performance can be expected as a result of research and development or of high volume production for other applications.

Another trend which has had major impact on dimmer economics is the recent transition from the construction of dimming systems designed around load-patching to a relatively modest number of large wattage dimmers to the "dimmer-per-circuit" approach which requires hundreds of smaller wattage dimmers.

Because dimmers, large or small, require a similar basic complement of electronic and mechanical components, dimmer-per-circuit systems require new economies in dimmer design if the size and cost of the total system is to be competitive with conventional systems based on a far smaller number of larger wattage dimmers. Centralized triggering circuitry has been proposed as a method of reducing costs, but it is the choke which constitutes the largest single component in a small dimmer and one of the most expensive.

Chokes have a variety of other, undesirable effects on prior art dimmer designs. Due to their weight, chokes require substantial mounting provisions, increasing a dimmer's mechanical costs. In fact, the chokes alone account for more than 50% of the total weight of many dimmer enclosures and add hundreds of pounds to the shipping weight of a portable lighting system.

Chokes waste electrical energy in the form of heat as a result of both $I^2R$ and core losses (losses added to the voltage drop and switching losses across the devices). This "choke loss" reduces voltage to the lamp, which, at full conduction, results in a significant loss of maximum fixture intensity. This voltage drop is, however, non-linear with respect to output voltage so that deliberate distortion must be introduced into the control input/output voltage response (or "curve") of open-loop digital and analog dimmers to compensate. Voltage drop also varies with significant changes in dimmer load.

The use of a larger choke to increase rise time will also result in increased power dissipation in the choke, and therefore improvements in rise time come at the cost of heat increased heat generation. This heat generation restricts the density of dimmer packaging; affects associated wiring and components; and requires airflow for cooling. However, unlike semiconductor packages, the efficiency of choke heat transfer to the ambient cannot be significantly improved with techniques like heatsinking in order to increase packaging density and/or reduce operating temperatures.

Chokes also frequently suffer from magnetically-induced vibration at certain phase angles, which, without careful isolation, produces audible noise which can distract the audience or be detected by sound recording equipment. This isolation, of course, is often at odds with the requirement for proper cooling.

Certain choke designs can also generate strong magnetic fields which have undesirable effects on nearby electronic equipment.

The recent trend to dimmer-per-circuit construction for portable dimming systems with its intrinsic requirement for a large number of conductors between dimmers and fixtures requires expensive multiconductor cable and multipole connectors. It has been apparent for some time that if the dimmers could be relocated at the fixtures themselves, relatively inexpensive power cable and connectors could be used to link the dimmers with the mains supply at a considerable savings in total system cost. However, the chokes required by prior art dimmer power stages would produce an unacceptable increase in weight at the fixture position.

There is, therefore, the need for a new type of dimmer power stage which requires no choke or minimizes the size, weight, and thermal losses of the inductor required.

There is also the need for such a power stage to employ an improved method of semiconductor device protection.

The specialized bulbs employed in performance lighting fixtures do not incorporate internal fusing and, on failure, can draw hundreds of amperes through the dimmer. Similarly, shorts in fixtures, wiring, or connectors can draw equally large amounts of current through the dimmer before a supply circuit breaker can open. The semiconductors employed in any professional electronic dimmer must be inherently capable of withstanding such inrush currents or be provided with the additional means to do so.

In prior art large wattage dimmers (i.e. 6000-12000 watts) the continuous currents involved require the use of thyristors whose ability to withstand inrush currents ($I^2t$ rating) exceeds the typical fault currents encountered. Further, early concerns about thyristor quality control lead to the use of overspecified devices, whose added cost was not significant in the context of the relatively modest number of dimmers required per installation. The trend to dimmer-percircuit construction has required that new economies be achieved in the per unit production cost of dimmers in the 1000 watt and 2000 watt range. The SCRs or Triacs required by the modest continuous currents involved in such dimmers possess $I^2t$ ratings far lower than typical fault currents (which are determined not by the wattage of the dimmer itself but by the fault current available to the dimmer from the building service as limited by the impedance presented by the supply feeder. The survivability of the dimmer's semiconductors is also affected by the quality of its choke insofar as the greater the rise time, the longer the period is available for circuit protective devices to act.) Devices with adequate $I^2t$ can be obtained, but at a cost premium which produces an unacceptable increase in the cost of 1000 watt dimmers and an undesirable one in the case of 2000 watt units. As a result, certain modern "professional" dimmers employ semiconductors which will not survive the fault currents available in some installations. Many other dimmers in the 1000 watt range employ the combination of devices with a moderate withstand rating and a high-speed silver-sand fuse to increase the probability of survival. The requirement for a fuse, fuseholder, and circuit breaker with their associated mounting and wiring adds to both the parts and labor cost of dimmer assembly; to the front panel area requirements of each dimmer; and means the nuisance and expense of fuse replacement for the user.

It has long been apparent that a better solution would be current-limiting; sensing the fault current and shutting down the dimmer electronically before damage can occur. At least two phase-control dimmers have been built with current-limiting, but because it is impractical to turn off a thyristor before the next zero-crossing, its value for device protection is dubious. It has, therefore, also become desirable for an improved dimmer power stage to provide current-limiting as a means of device protection.

Considerable attention has been paid to the prospects for an improved dimmer power stage requiring minimal magnetics. At least three distinct approaches to such a power stage have been identified.

One such approach requiring no inductor is the "skipped half-cycle" dimmer as described in U.S. Pat. Nos. 3,691,404 and 4,287,468. This approach has, in fact, been used for the control of industrial heaters. However, at a line frequency of 60 cycles, it provides insufficient resolution for professional lighting use and can produce flickering of the bulb, particularly the low wattage bulbs typical of borderlights. While a skipped half-cycle dimmer, unlike several other approaches, can employ a conventional Triac or SCRs, such embodiments cannot provide current limiting for device protection (which is made more difficult by the lack of a rise time limiting inductor.)

A second approach to the "chokeless" dimmer is the use of high wattage power transistors operating in a pure linear mode. FIG. 2 illustrates the half-cycle waveform typical of such a dimmer at approximately half intensity. Line 201 illustrates the AC input waveform. Line 202 illustrates the output waveform.

Lacking the abrupt changes in voltage and current of the phase-control approach, the linear dimmer does not produce transients and as such EMI. Small DC versions of the linear dimmer have long been employed for the adjustment of control and instrument panel illumination. In performance lighting (where it has frequently been referred to as the "transistor" dimmer) the linear approach has long been regarded as the obvious successor to the phase control unit, awaiting only the availability of suitable devices at competitive prices.

Despite its attractive simplicity, the linear dimmer has a severe inherent limitation. In FIG. 2 shaded area 203 represents electrical energy wasted in the form of heat. As much as 25% of the load wattage must be dissipated by the devices at some settings—versus 3-5% in prior art phase control designs (only part of which is dissipated in the devices themselves). Therefore a linear dimmer must be capable of dissipating a thermal load as much as 10 times that of the devices in a phase control dimmer of identical capacity. Either massive heat sinks or some exotic form of cooling would be required; offsetting many of the benefits of choke elimination.

A third approach to a power stage with minimal magnetics is the pulse width modulated or "switched mode" dimmer.

The advantages of pulse width modulation have been well illustrated in the context of electronic power supplies. Followspots, slide and motion picture projectors, and film lighting equipment with both AC and DC gaseous discharge sources have all employed switched mode supplies to effect major reductions in weight relative to linear supplies. Switched mode dimmers, as disclosed in various U.S. Patents are employed for the intensity control of flourescent lighting fixtures. And Mole Richardson Co. of Hollywood, CA has introduced the Molelectronic$^r$ 12000 watt dimmer for the control of incandescent lamp loads operating on DC services.

The applicability of switched mode operation to the control of incandescent lamp loads operating on AC services has therefore been obvious to those skilled in the art for some time.

FIG. 3A illustrates the output half-cycle waveform typical of such a dimmer at approximately half intensity. Because the transistors operate only in a switched mode, heat rise is modest in comparison with the pure linear approach. However, the waveform produced is unacceptable for reasons of EMI generation unless filtered.

FIG. 3B illustrates the effect of adding a magnetic inductor . . . the synthesis of an amplitude-modulated sinosoidal waveform.

Although such a switched mode dimmer still requires an inductor it exploits the principle that the higher the operating frequency, the smaller the inductor. An operating frequency of 20 kHz, for example, would place the fundamental frequency beyond the range of human hearing and allow a substantial reduction in the inductor's size and weight relative to that required by a prior art phase control dimmer.

The growing volume of switched mode power supply production assures the availability of suitable control ICs, devices, and inductor materials.

The switched mode dimmer design, however, has a number of limitations. First, such dimmers would be both far more complex to design and have little commonality with prior art phase control units. The existing dimming equipment manufacturers are therefore at the lower extreme of the learning curve and development time and cost would suffer accordingly.

The switched mode dimmer is also more complex in construction, raising questions about its reliability and ease of field troubleshooting and repair relative to prior art phase control dimmers.

This relative complexity and the cost/watt projections of switched mode power supply manufacturers suggest that switched mode dimmers will be far more expensive than current phase control units. Although the cost of some components may benefit from the total volume of switched mode supply production, the switched mode dimmer itself would be sufficiently specialized that its assembly cost would not.

Nor is the switched mode dimmer's reduction in inductor size without limitation. Minimizing inductor size requires maximizing operating frequency. However as frequency increases, so do losses in the switching transistors and the inductor core, thus limiting inductor size reduction. Further, switched mode dimmers operating at higher frequencies are capable of RF interference; and as such, would require design, construction, and testing to FCC standards.

There is, therefore, a compelling demand for an improved power stage, but none yet proposed by those skilled in the art provides professional performance without either unacceptable thermal losses or complexity relative to prior art phase control units.

SUMMARY OF THE INVENTION

Refer now to FIG. 4A, a block diagram of the power stage of the preset invention.

Like prior art phase-control dimmer power stages, the power stage of the present invention employs a semiconductor power controller means 419 series-connected between an input 401 from the AC mains supply and an inductive load 499. Unlike such prior art dimmers, the power stage of the present invention employs semiconductor devices capable of modulating the voltage or current supplied to load 499 under the active control of their gate voltage or current.

The employment of such devices per se is neither novel nor does it lead directly to significant benefits. The active gate control afforded by such devices does allow electronic current-limiting and FIG. 4A accordingly illustrates the combination of a current sensor 451, current limiting circuit 453, and clamp 455. But current limiting, while desirable, is not as much a benefit of the use of such devices as a precondition—for known devices of this type lack even a fraction of the I2$_t$ ratings typical of thyristors.

Nor does the use of such devices suggest any specific output waveform or drive circuit with significant benefits.

Drive circuit 404 could be a prior art phase control circuit, in which event the dimmer's output waveform would be identical to an unfiltered thyristor dimmer as illustrated by line 102 in FIG. 1—and would have the same undesirable effects. The addition of an inductor to increase rise time in the manner taught by prior art would have identical effects, costs, and disadvantages. The sole distinguishing feature of such a dimmer, electronic current limiting, would be offset by the higher component costs of the necessary devices (maintained permanently by their larger chip area) and by the additional control circuitry required.

Equally, drive circuit 404 could be linear in operation, causing the dimmer to produce the output waveform illustrated in FIG. 2—and suffer the thermal problems described.

Equally, drive circuit 404 could operate in a pulse-width modulating mode, causing the dimmer to output the waveform illustrated in FIG. 3A. While it would allow the use of a smaller filter inductor, the problems of complexity, lack of commonality with prior art dimmer designs, and potential RFI generation have been described.

It is clear, therefore, that neither the use of new power devices nor their combination with any known or obvious drive circuit suffices to produce significant benefits over prior art thyristor-based designs without offsetting disadvantages.

The power stage of the present invention achieves such benefits with the addition of a third element in combination with the power devices 419 and a traditional phase control drive circuit 404. This third element is illustrated as a ramp generator 406 interposed between the output 403 of drive circuit 404 and the gate input 420 of devices 419.

When the output of drive circuit 404 turns on, it does so instantly. At the output of ramp generator 406 it slews from off to on at a slower rate, established by the circuit's design as 300–700 microseconds. Accordingly, the output devices 419, which accept the output 408 of ramp generator 406 as their gate input 420, do not turn instantly, but slew from zero load voltage or current to full conduction over a period on the order of 300–700 microseconds. The dimmer power stage of the present invention thus produces an output waveform similar to a properly filtered prior art phase control dimmer without the use of any passive inductor.

The advantages of such a dimmer power stage are many and immediate:

The elimination of the filter inductor, one of a prior art dimmer's most expensive components, effects a significant economy in parts cost, which is accompanied by savings in the dimmer's mechanical costs. The elimination of the filter inductor, a prior art dimmer's heaviest single component, also allows the elimination of the mechanical provisions to support and enclose them.

The elimination of the filter inductor and its reduction in total dimmer weight of 50% or more also produces continuing benefits of greater handling ease and reduced shipping costs in portable lighting applications. The substantial weight savings also permits distributing the dimmers to the fixture locations and, as such, the use of inexpensive cable and connectors for further substantial savings in total dimming system cost.

Unlike prior art dimmer designs, the weight reduction comes at no sacrifice of rise time.

The elimination of the filter inductor, a prior art dimmer's largest single component, also allows a reduction in dimmer volume with related benefits in mechanical cost reduction, improved handling ease, and reduced shipping costs.

The elimination of the filter inductor also eliminates a source of I²t and core losses as a source of voltage drop at the fixture and of generated heat. While the power stage of the present invention does produce heat, it is restricted to the devices themselves, whose transfer efficiency can be improved by known means, considerably simplifying the dimmer's thermal design.

The elimination of the filter inductor also eliminates the electronic dimmer's sole source of significant mechanical noise and strong magnetic fields.

These benefits come without the offsetting disadvantages which have characterized previous alternatives to the phase control dimmer. The thermal losses of the power stage of the present invention are little greater than those of an equivalent phase control dimmer and, being concentrated in the devices, may be more readily dissipated. The power stage of the present invention is simple both in design and operation and may be employed with any known phase control drive circuit with little or no modification.

Further, the rise time of the power stage of the present invention is easily selectable or adjustable over a wide range to suit the requirements of the specific application.

However, in contradistinction to prior art dimmer designs, the power stage of the present invention controls rise time by directly controlling the turn-on rate of the devices themselves. No step voltage or current transition is produced, and hence the dimmer's EMI noise spectrum is the ideal for a rise time of that duration.

Criteria for the selection of suitable power devices, and the near term advantages of employing field effect devices will be discussed.

Like prior art phase control dimmers, the rise time of the simplest embodiment of the power stage of the present invention will vary with changes in load impedance. An improvement is, however, disclosed by which this effect may be corrected.

A method of providing a simple current limit by clamping the maximum gate input voltage of a power control device with a gate voltage/output current relationship is disclosed.

The need to limit maximum device dissipation under current limiting is discussed, and the design of a simple dissipation limiting circuit is disclosed.

The preferred embodiment of the power stage of the present invention is disclosed, the design providing ramp generation; compensating for variations in load impedance; and limiting both current and dissipation with only six transistors.

PREFERRED EMBODIMENT

In sum, the dimmer power stage of the present invention offers substantial practical benefits in virtually every aspect of dimmer performance without a substantial increase in cost, complexity, or thermal losses. These benefits come as the result of the unit's basic principles; the combination of a phase control triggering circuit, output devices capable of linear operation, and a means to electronically limit the slew rate of their gate input. Although a specific preferred embodiment is disclosed, it should be clearly understood that many circuit designs are possible within the scope of these principles, and the method employed should not be understood as limited except by the claims.

The dimmer drive circuit, for example, may be analog open loop; or analog fed-back (as disclosed in U.S. Pat. No. 3,397,344); or digital (as disclosed in U.S. Pat. No. 4,241,295).

The means to limit the slew rate may comprise a separate hardware circuit, whether analog, digital, or a software function; or it may be partially or fully integrated into the triggering circuitry or the device drivers.

Similarly, the output devices may be of any known type suitable for the purpose. Although the benefits of certain types are discussed in the context of the preferred embodiment, it is understood that improvements to known devices and the evolution of new types may alter such preferences over time.

Such devices must satisfy certain basic requirements. Foremost is the ability to withstand the high instantaneous power dissipation which is characteristic of the power stage's operation, for while the thermal load is relatively modest if averaged across the half-cycle, it is concentrated in the ramp/turn-on period. Given both suitable instantaneous and average power ratings, devices are then selected on the basis of drive characteristics, protection characteristics, and conduction losses.

Currently available devices fall into two types: field effect devices and bipolar transistors. Of the two, field effect devices are currently preferred for five reasons: Field effect devices with suitable power ratings are becoming available; bipolar transistors with sufficient peak power dissipation are not. Bipolar transistors are prone to thermal runaway; field effect devices are inherently current-limiting provided that their gates are not overdriven. Field effect devices can be parallelled more readily; have greater linearity; and require less power to drive.

Figure 4A:
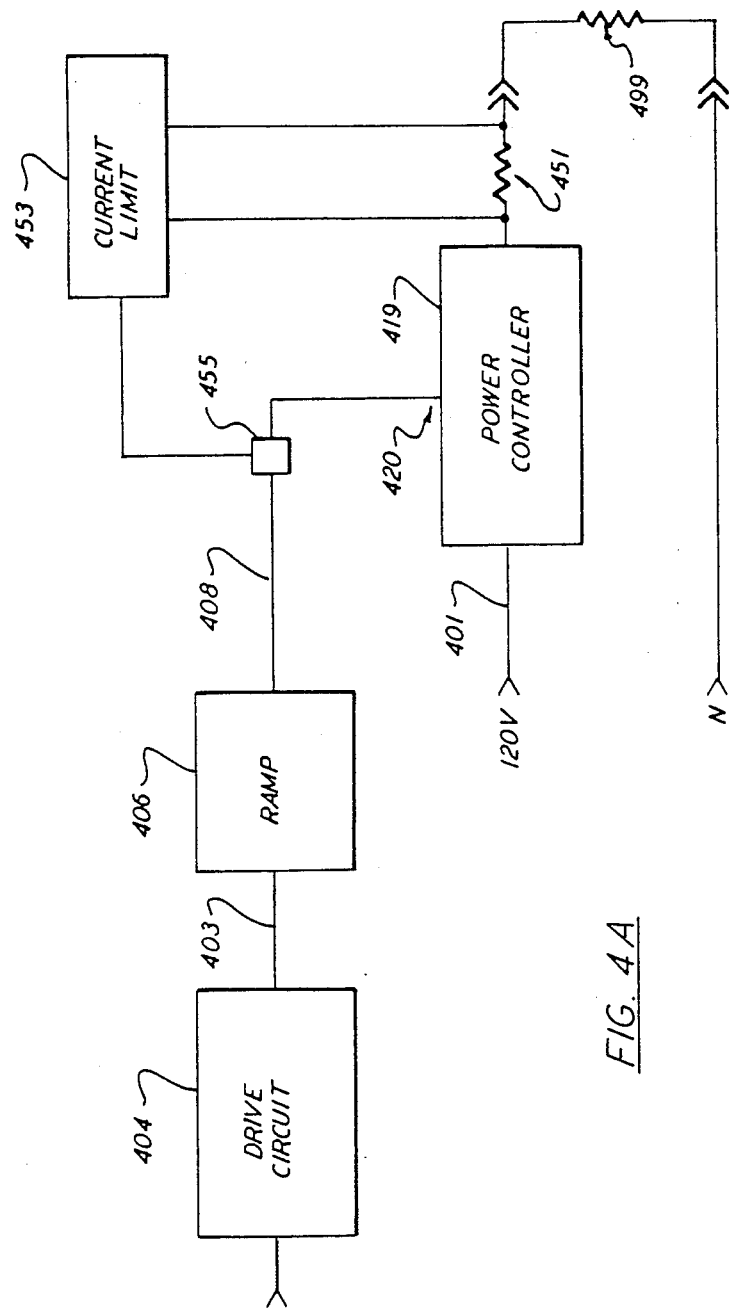
FIG. 4A a block diagram of the dimmer power stage of the present invention.
Figure 4B:
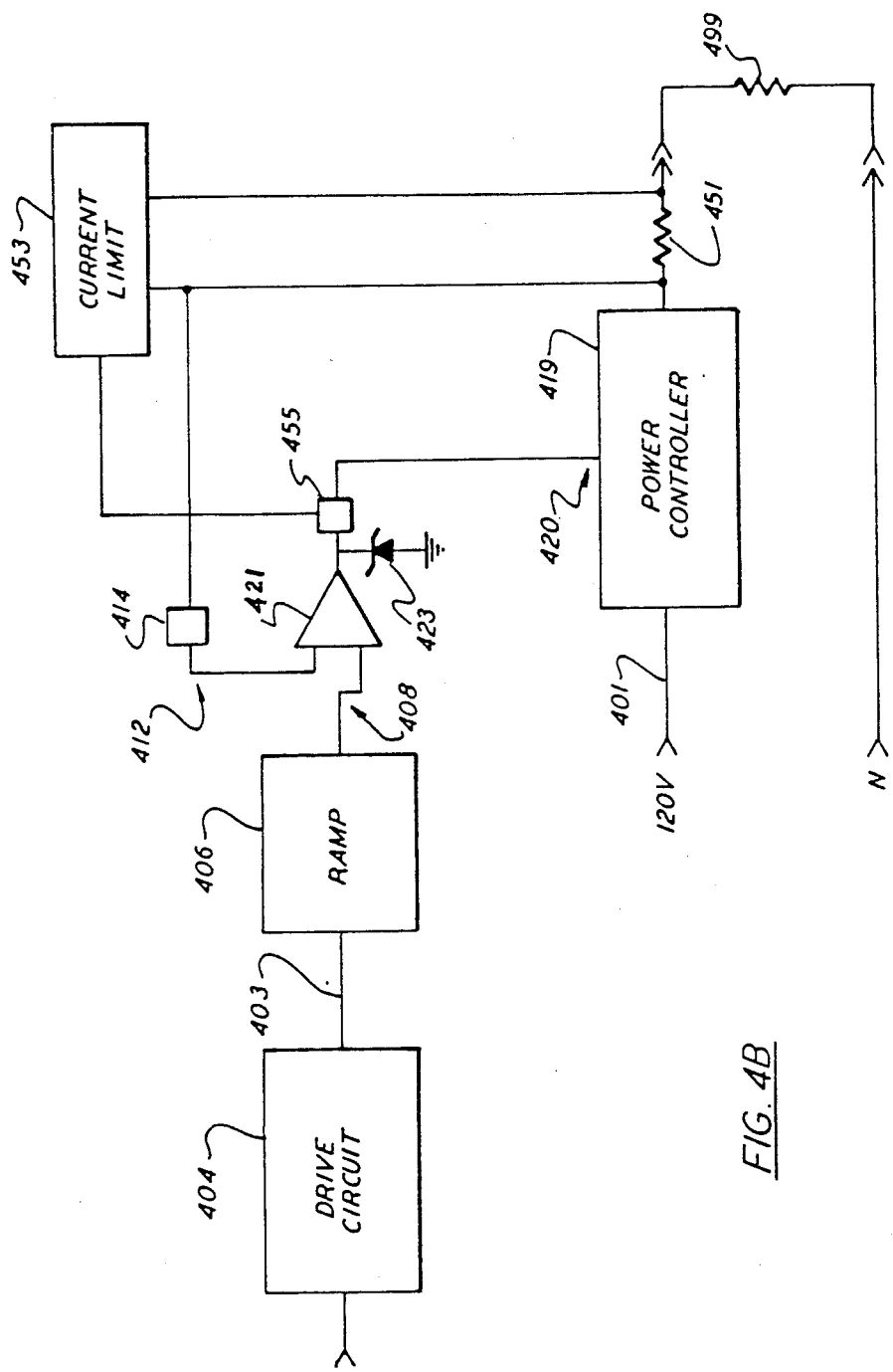
FIG. 4B is a block diagram of the dimmer power stage of the present invention with the addition of ramp feedback.

Refer now to FIG. 4B, a block diagram of the dimmer power stage of the present invention adapted for efficient use of field effect devices. Parts with the same function in FIG.4A are identified with the same reference number.

The input voltage at the gate of a field effect device controls its output current. Therefore, for a given input voltage in the device's linear region, the actual voltage at load 499 is a factor of the impedance it presents which varies with the number of filaments connected and their temperature. This mechanism has no effect on the dimmer when off or in full conduction, but during the ramp/turn-on period it results in non-linearity of the ramp at a given phase angle with variations in the load impedance—and as such, undesirable variations in both average power at the lamp and rise time.

Like "choke drop" this non-linearity reduces the efficacy of EMI suppression and produces apparent variations in the dimmer's "curve". Although with overall feedback as disclosed in U.S. Pat. No. 3,397,344 dimmers compensate for the effect on average power, they do not correct for the variation in rise time.

Unlike prior art dimmer power stages with passive rise-time limitation, the power stage of the present invention allows for the correction of this non-linearity. The means for this correction is illustrated in FIG. 4B as a ramp feedback circuit comprising differential amplifier 420 interposed between ramp generator 406 and the gate input 421 of the devices 419, accepting as its second input, the dimmer's output voltage via conductor 412 and feedback network 414. Feedback network 414 shapes, rectifies, or attenuates the load voltage derived from load 499, as may be required. Some embodiments, including those of FIG. 5 and FIG. 6 will provide two means analagous to amplifier 420 and network 414, one provided for each half-cycle. The actual output voltage produced by the interaction of the current resulting from a given gate input voltage with the impedance of load 499 is compared with the desired value and the gate input voltage corrected accordingly. The power stage of the present invention is therefore capable of maintaining the same ramp at each phase angle and as such, consistent curve and EMI suppression despite variations in load impedance.

The gate voltage/output current relationship of field effect devices also permits limiting output current by limiting maximum gate input voltage. Accordingly, FIG. 4B illustrates zener diode 423 as clamping maximum gate voltage.

Figure 5:
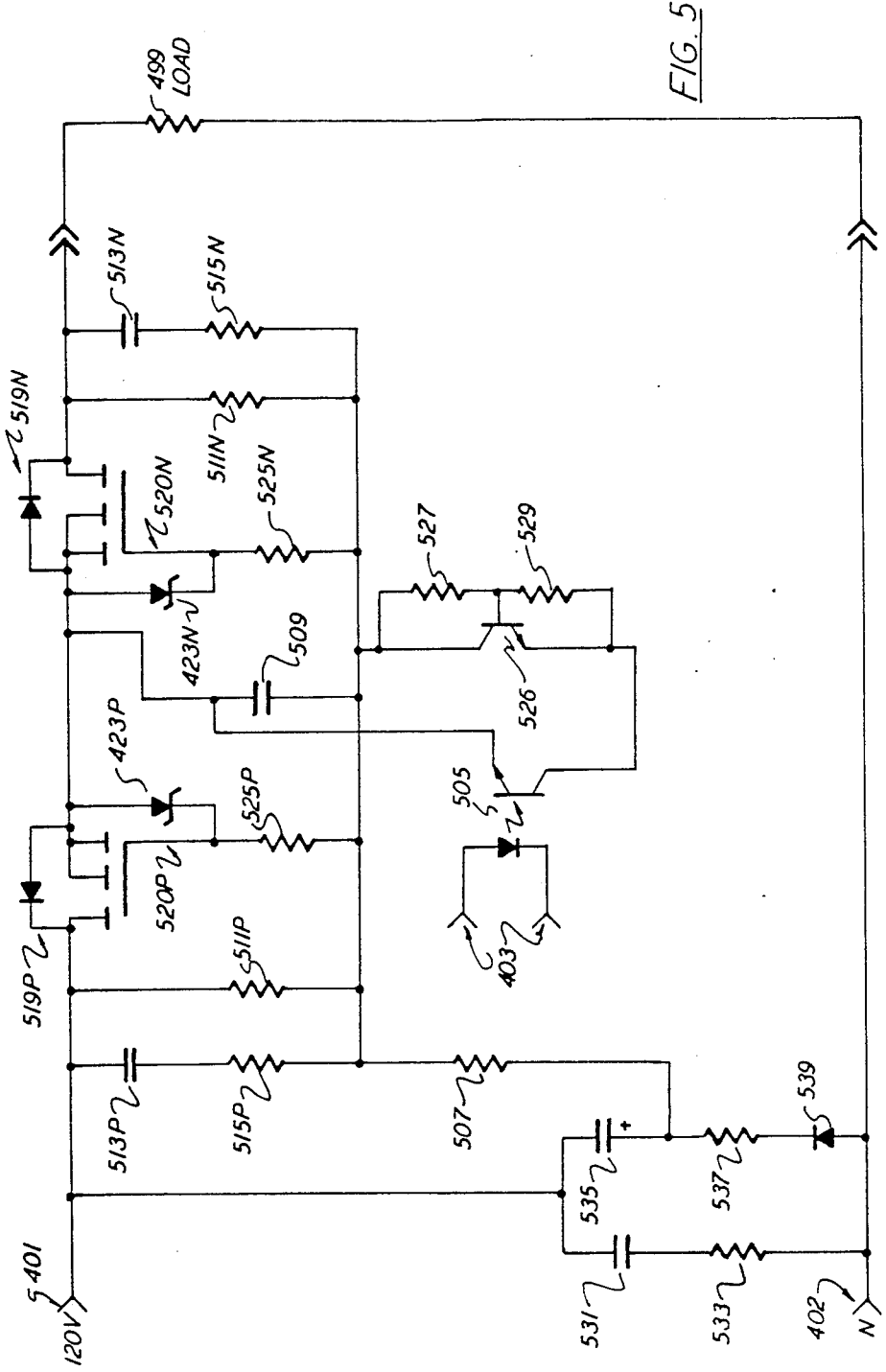
FIG. 5 is a schematic of the preferred embodiment of the dimmer power stage of the present invention.

Refer now to FIG. 5 where the preferred embodiment of the power stage of the present invention is illustrated. The output devices, ramp generator means, and ramp feedback means have been integrated in a single circuit of unusual simplicity. Components with the same function as those in previous Figures are identified with the same reference number. Portions of the circuit are symmetrical with respect to the polarities of the two half-cycles and those components provided for both half-cycles are identified with the same reference number, the suffix "P" or "N" identifying the half-cycle in which they are employed.

Power devices 519P and 519N are series-connected between the input 401 from the AC mains supply and load 499. Their gate inputs 520P and 520N are driven by capacitor 509, which is charged to raise the devices into conduction, the rate of charging determining the device's slew rate and, as such, the dimmer's rise time.

The drive circuit connects with the power stage via input 403. In this embodiment, the drive circuit's output states are the reverse of a prior art dimmer's; turning off to bring the output devices into conduction and vice versa.

The drive circuit's output at 403 is on at the start of a half-cycle, causing opto-isolator 505 to hold the output devices off by discharging capacitor 509, reducing the gate input voltage of the devices below the turn-on threshold. The use of an opto-isolator for this purpose has the added benefit of providing voltage isolation between the drive circuit and the output stage which operates at line potential.

At the desired phase angle, the drive circuit turns off, and the opto-isolator 505 allows capacitor 509 to start charging. The rate of charge, and hence the ramp, is determined by several mechanisms.

With device 519 in the off state, the considerable voltage across the device allows the voltage across capacitor 509 to increase via both resistor 507 and resistor 511. Initially, the charging current through resistor 511 is larger than that through resistor 507, so capacitor 509 charges at a rate initially dependent on the line voltage. This relationship provides the ramp feedback whose benefits are described in connection with FIG. 4B. The current through resistors 511 and 507 starts to charge capacitor 509, causing device 519 to come into conduction.

Current passed by device 519 which is determined by its transconductance is converted to a voltage drop by load 499. Because the transconductance of preferred devices is high the circuit will display a relatively high voltage gain, hence the voltage drop across 519 will decrease greatly for a small increase in the voltage applied to input 520.

When opto 505 turns off capacitor 513 will start to discharge through resistor 511. At the moment that 519 starts to conduct capacitor 513 will have been charged to near line potential. As 519 comes into conduction, voltage at the end of 519P connected to 401 or at the end of 519N connected to 499 will start to drop much more quickly than the voltage across 509 is rising. This will divert most of the current from resistors 507 and 511 to discharging 513 causing capacitor 509 and inputs 520 to remain at a relatively constant voltage. The gain of the circuit will now tend to maintain 520 at this fixed potential as 513 discharges. The circuit will cause transistor 519 to conduct whatever current is necessary to conform the output ramp to the discharge shape of 513. If there is a sudden increase in the current required by the load, the voltage at 520 and across 509 will have to increase. Hence current will be diverted to charge 509. Hence 509 controls the maximum slew rate for current while 513 controls the maximum slew rate for voltage. Normally the available current is high enough that it is the voltage rise that is controlled.

The rate of discharge of 513 and hence its curve shape, is dependent on two different mechanisms. The current through 511 causes it to discharge in the exponential fashion of a simple RC constant. The current through 507 causes 513 to discharge in a linear manner. The ramp up of the preferred embodiment is a combination of the two. The function of resistor 515 is to limit surge currents.

The decreasing voltage potential across device 519 will result in a decreasing current flow through resistor 511 and as such the rate of charge of capacitor 509 until the point at which the current flow through resistor 507 will dominate. Resistor 507's current source is a line-operated DC power supply comprising capacitor 531, resistor 553, capacitor 535, resistor 537, and diode 539 which maintains a substantially constant positive voltage potential relative to source voltage and as such, a linear rate of charge for the balance of the ramp/turn-on period.

Capacitor 509 continues to charge until reaching the gate voltage corresponding to the maximum normal operating current, which is clamped by zener diode 423. Resistor 525 prevents high frequency oscillation of the power device.

At the zero-crossing at the conclusion of the half-cycle, the drive circuit output at 403 will turn on, causing opto-isolator 505 to discharge capacitor 509, shutting off the flow of current through device 519.

Because the devices employed have a gate turn on threshold of about 3 volts, a complete discharge of capacitor 509 would introduce a time delay between the drive circuit's output transition and the start of the ramp while capacitor 509 charges to the threshold voltage. Capacitor 509 is therefore biased by transistor 526, resistor 527, and resistor 529 which limit the discharge of capacitor 509 to a value just below the gate turn-on threshold.

While clamping maximum gate input voltage affords a simple, high-speed current limit, it does not suffice as the sole method of device protection for two reasons. One is that the amount of current passed at any given gate input voltage varies over temperature and from device to device. The other is that while limiting current prevents I$^2$T failures of the semiconductor devices' bond wires, because it holds the device within their active area, limiting current also causes the voltage potential across the devices (and with it, dissipation) to increase. The result, should the devices attempt to current-limit into a low-impedance load for more than a very short time, is thermally-induced failure of the chips themselves due to excess dissipation.

A dimmer power stage employing devices subject to such failures must provide a means limiting device dissipation as well as just current. This requires sensing a factor reliably related to dissipation. Ideally, both voltage and current would be sensed and wattage calculated from them, but the circuitry required to sense both factors and calculate the third is both complex and costly. However, if the device is still in saturation, then it behaves essentially as a resistor, and measured current is correlated closely enough to dissipation to serve the purpose of device protection. While sensing current is a less accurate method of gauging dissipation than calculating wattage and, as such, requires that the devices be specified more conservatively, it has been found that the added device cost does not justify the use of wattage calculating circuitry.

Figure 6:
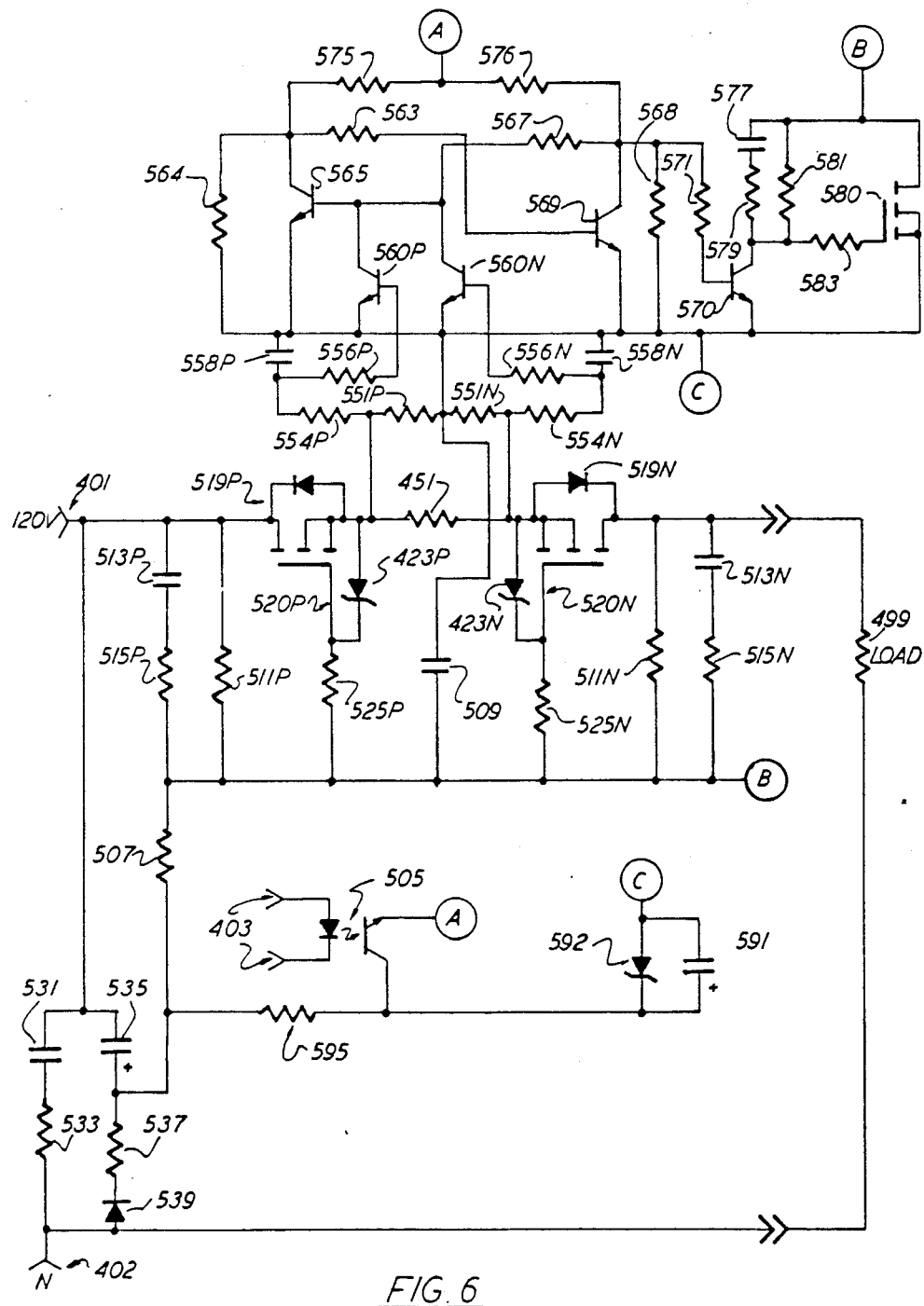
FIG. 6 is a schematic of the preferred embodiment of the dimmer power stage of the present invention with the addition of a means limiting device dissipation.

Refer now to FIG. 6 where an embodiment of the power stage of the present invention limiting device dissipation is illustrated. Components with the same function as those in previous figures are identified with the same reference number. Portions of the circuit are duplicated for the polarities of the two half-cycles and components provided for both but identical in operation are identified with the same reference number, the suffix "P" or "N" identifying the half-cycle for which they are provided.

The embodiment illustrated in FIG. 6 employs the same ramp generator, ramp feedback means, and power supply as that in FIG. 5.

As in FIG. 5, the devices are held off by discharging capacitor 509, which is accomplished in FIG. 6 by FET 580. By exploiting the property of FETs that a gate-to-drain connection will cause an "on" state just above the gate turn-on threshold, and by selecting a FET for 580 whose gate turn-on threshold is slightly below that of device 519, FET 580 can also serve as the biasing means (replacing transistor 526, and resistors 527 and 529) of FIG. 5. Further, as the gate turn-on threshold of FETs varies with temperature, the use of a pilot FET 580 selected for turn-on threshold/temperature characteristics similar to those of FET 519 affords some measure of bias voltage compensation for changes in temperature.

The embodiment illustrated in FIG. 6 accepts a conventional input 403 from the drive circuit (that is, the input turns on to bring the devices into conduction). Resistor 595, shunt zener diode 592, and capacitor 591 comprise a zener-limited power supply providing a low voltage to optoisolator 505. When input 403 turns on, optoisolator 505 provides power supply to the dissipation limiting circuit via point A.

When input 403 turns on, the value of the voltage divider formed by resistors 576 and 568 relative to that formed by resistors 575 and 564 assures that transistors 565 and 570 turn on while transistor 569 remains off.

Turning transistor 570 on turns FET 580 off, allowing the potential between point B and point C to rise above the bias level as capacitor 509 is charged by the mechanisms of resistors 507, 511, 515 as previously explained. Resistor 581 serves as the DC pull-up resistor for transistor 570. Resistor 583 prevents the oscillation of device 580.

As device 519 passes increasing current as capacitor 509 is charged, a voltage drop develops across resistor 451 and a voltage drop of half that value develops across each resistor 551. The particular arrangement of resistors 451, 551P, and 551N requires only one resistor in the current path, which by virtue of the relatively high cost of resistors of suitably low value and high wattage, effects a significant economy over the use of two resistors of half the value of 451.

Initially, negligible current flows from the appropriate resistor 551 to the base of the appropriate transistor 560, so resistors 554 and 556 have no effect and the potential across resistor 551 appears between the base and emitter of transistor 560. As current through device 519 increases, the voltage across the base of transistor 560 increases. When that voltage exceeds the $V_{be}$ of transistor 560, it is brought into conduction. This, in turn, diverts the flow of current that was established at turn on from point A to the base of transistor 565 via resistors 567 and 576. The diversion of current away from the base of transistor 565 by transistor 560 increases with increased current passed by device 519, causing transistor 565 to come out of conduction, which increases the flow of current to the base of transistor 569 via resistor 563. As transistor 569 is brought into conduction, it diverts additional current from the base of transistor 565, providing positive feedback which accelerates the process (and makes the circuit bistable).

Excess current flow through device 519 via resistor 451, therefore, "trips" the dissipation protection circuit, causing transistor 569 to divert current from the base of transistor 570 (which, as noted, was raised into conduction at turn on). By turning transistor 570 off, the potential between the gate and drain of FET 580 established by capacitor 509 causes FET 580 to turn on, discharging capacitor 509 to the bias level, thus shutting device 519 off.

Whether the dissipation limiting circuit has been tripped or not, optoisolator 505 will remove power supply from it at the end of the half cycle when the drive circuit turns off, assuring the discharge of capacitor 509 to the bias level. When the drive circuit turns on again at the desired phase angle of the following half-cycle, transistors 565 and 570 will be turned back on by the mechanisms previously described. The embodiment in FIG. 6 thus does not "latch" a fault condition, requiring a manual reset (although such operation could be readily provided). Instead it "tests" the load on each half-cycle and thus automatically resets when the fault is cleared. This does, however, mean that the power stage illustrated in FIG. 6, when operating into a fault, would abruptly turn device 519 off under load every half-cycle, generating undesirable transients. A means is therefore provided, in the form of capacitor 577 and resistor 579 to slow the rate of turn-off to prevent such transients.

The dissipation limiting means must also ignore current transients produced by certain normal operating conditions (such as cable capacitance). Capacitor 558 is provided for this purpose.

While the dissipation limiting circuit illustrated in FIG. 6 affords a more accurate control of current than a gate clamp, it is slower in operation. Gate clamps are also provided, therefore, as a faster, if less accurate, form of protection. The time delay required for the dissipation limiting circuit to act also means that the current at the base of transistor 560 may reach a value several times higher than that at the theoretical trip point before device 519 is turned off. Resistors 554 and 556 are provided to limit excess current flow through the base of transistor 560.

FIG. 6 therefore illustrates an improved dimmer power stage, adaptable to any known phase control circuit, which provides an output free of undesirable transients, without the significant disadvantages that have attended both prior art phase control dimmers and the proposed alternatives to them.

While the preferred embodiment of the power stage of the present invention achieves these benefits; compensates for variations in load impedance; and limits both excess current and dissipation—all with a total of six transistors—it is only one of many methods of achieving the objects of the invention, and the methods employed should not be understood as limited except by the claims.

While the preferred embodiment may be used with any prior art phase control drive circuit, it should be understood that designs are possible in which the means limiting device switching rate is integrated fully into the triggering circuit such that a block diagram of the dimmer would illustrate the drive circuit as connected directly to the devices without a discrete ramp generator being identifiable.

Similarly, trends toward the "smart" power semiconductor suggest that at some future point, if volume warrants, the switching rate limiting means may be made integral to the output devices themselves.

Similarly, while the preferred embodiment controls rise time by controlling voltage (and hence is not adversely affected by changes in load) it should be understood that the same principles may be employed in embodiments controlling current.

Similarly, while the ramp shape produced by the preferred embodiment is not the same as that of an LC network, it should be understood that as the dimmer power stage of the present invention controls rise time electronically, that the shape of the rise can be adjusted by the design of the ramp generator means.

The term "phase control" should be understood as identifying that class of dimmers whose output is either off or in full conduction, with a minimum number of transitions between the two states during each half-cycle. It is these abrupt transitions that are the cause of the phase control dimmer's EMI generation, and all prior art alternatives to it lacking a passive inductor (i.e. the "skipped half cycle" and "linear" dimmers) have achieved this object only by generating output waveforms that are inherently free of such transitions. The pulse-width modulated dimmer generates the same abrupt transitions as the phase control dimmer and employs the same passive filtration to reduce EMI.

The control of a dimmer's rise time by controlling the switching rate of its active devices is, therefore, not taught by prior art.

Figure 1:
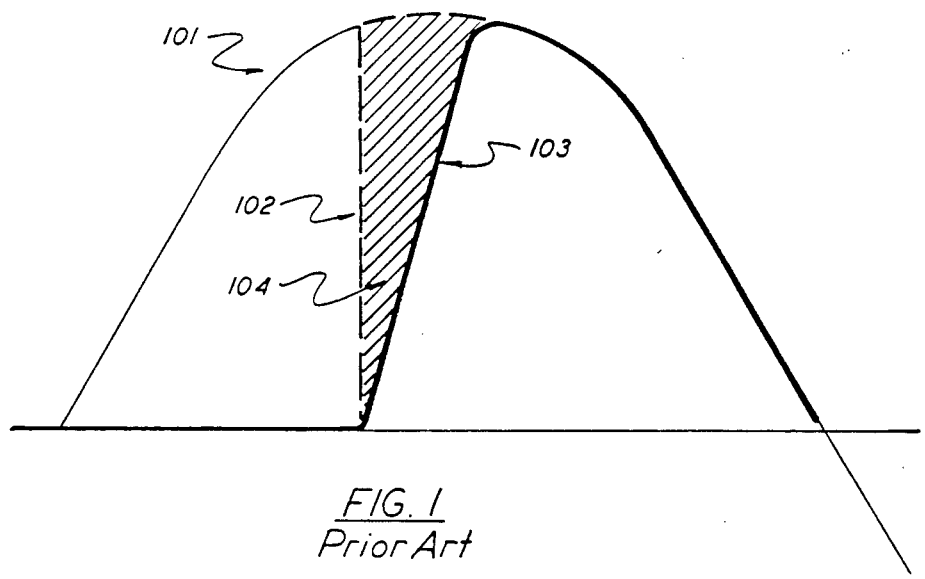
FIG. 1 illustrates the half-cycle output waveform typical of a prior art phase control dimmer at approximately half intensity.
Figure 2:
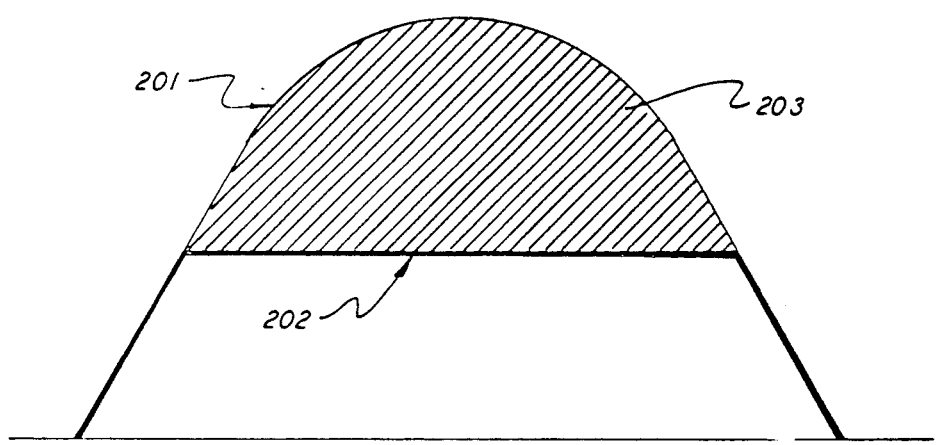
FIG. 2 illustrates the half-cycle output waveform typical of a linear dimmer at approximately half intensity.
Figure 3A:
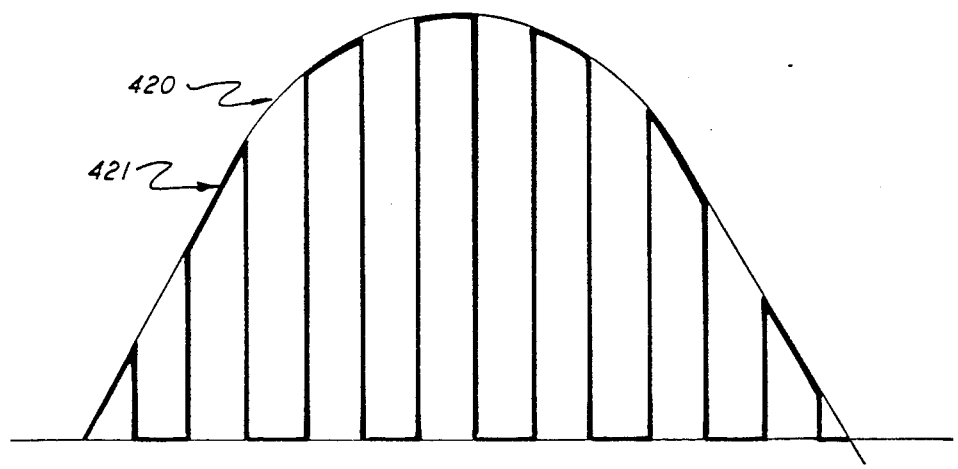
FIG. 3A illustrates the half-cycle output waveform typical of an unfiltered pulse-width modulated dimmer at approximately half intensity.
Figure 3B:
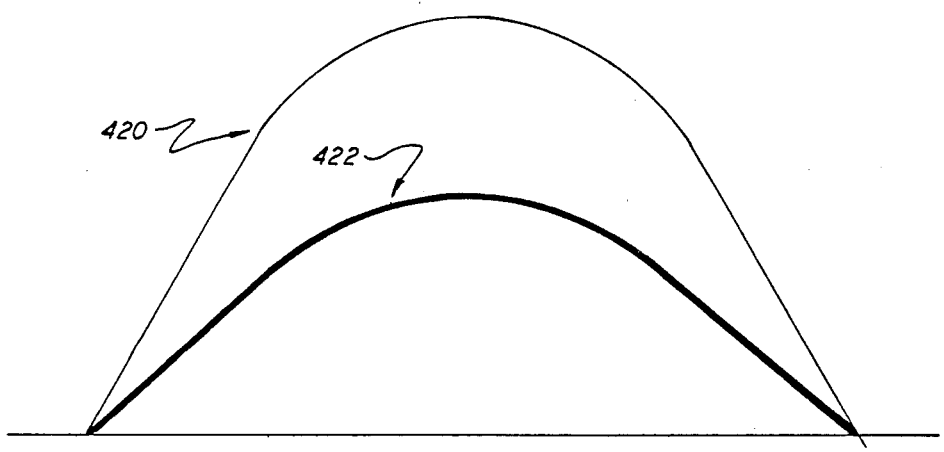
FIG. 3B illustrates the half-cycle, half-intensity output waveform typical of a pulse-width modulated dimmer with the addition of a filter inductor.

The most substantial benefits of the application of the principles of the present invention are achieved in dimmers whose output waveforms have at least one transition between off and full conduction during substantially each half-cycle of the AC source. However, the applicability of the principles disclosed within should not be understood as limited to the simple gate turn-on operation illustrated in FIG. 1 but may embrace other AC waveforms having the same characteristic abrupt transitions, and hence falling within the same class.

One example would be a gate turn-off waveform. While it would render device protection more difficult, a significant number of such dimmers in combination with gate turn-on units in the same system might compensate for the shift in power factor, and with it, excess current flow in the neutral conductor.

Similarly, "parametric" operation, including one turn-on and one turn-off per half-cycle with the period of conduction arranged symmetrically about the 90° phase angle might be employed for the same purpose.

A dimmer power stage may be designed that switches between two or more output waveforms depending upon desired load voltage for the specific purpose of reducing thermal losses.

All such power stages limiting the switching rate of the active devices to control the EMI product of their abrupt transitions would thus fall within the scope of the invention.

| Table of Preferred Component Values for the Embodiments of FIG. 5 and FIG. 6 | |
|---|---|
| 423 | 7 volt Zener Diode |
| 451 | Depends upon dimmer wattage |
| 505 | 4N37 optoisolator |
| 507 | 330k ohm |
| 509 | 5000 pf |
| 511 | 47k ohm |
| 513 | 5000 pf |
| 515 | 1k ohm |
| 519 | FET |
| 525 | 100 ohm |
| 527 | Depends upon dimmer wattage |
| 528 | Depends upon dimmer wattage |
| 531 | .05 uf 500 volt |
| 533 | 10 ohm ½ watt |
| 535 | 600 uf 400 volt |
| 537 | 100 ohm ½ watt |
| 539 | 1N4404 diode |
| 551 | 2.2 ohm |
| 554 | 220 ohm |
| 556 | 220 ohm |
| 558 | 2.7 nanafarad |
| 560 | CA3046 |
| 563 | 47k ohm |
| 564 | 10k ohm |
| 565 | CA3046 |
| 567 | 47k ohm |
| 568 | 22k ohm |
| 569 | CA3046 |
| 570 | CA3046 |
| 571 | 22k ohm |
| 575 | 10k ohm |
| 576 | 6.8k ohm |
| 577 | 1.5 nanafarad |
| 579 | 1k ohm |
| 580 | VN0606M |
| 581 | 47k ohm |
| 583 | 100 ohm |
| 591 | 47 uf 6 volts |
| 592 | 4.7 volt Zener diode |
| 595 | 100k ohm |

What is claimed is:

1. Electronic dimming apparatus comprising a semiconductor power controlling means for coupling a lamp load to an alternating current source, and for variable controlling the average power supplied to said lamp load by adjusting the relative proportion of substantially each half-cycle of the alternating current waveform in which said semiconductor power controlling means is in a substantially conductive versus a substantially non-conductive power condition; said semiconductor power controlling means having a control input and adapted to modulate the instantaneous amplitude of the voltage or current supplied to said lamp load under the active control of said control input, said semiconductor power controlling means further having an inherent minimum duration required for a transition between one and the other of its substantially conductive and substantially non-conductive power conditions in response to a stepped change between a value at its control input producing the one and a value producing the other of said power conditions; means for triggering responsive to at least a first input condition corresponding to a desired average power to be supplied to said lamp load and further responsive to the zero-crossing of said alternating current waveform, said means for triggering having at least one output, and producing at least one change in condition at said output substantially corresponding to the phase angle of said alternating current waveform of said half-cycle at which said semiconductor power controlling means must change from one of said power conditions to the other of said power conditions to supply said desired average power to said lamp load; means for transition control responsive to said output of said means for triggering and having an output coupled to said control input of said power controlling means, for controlling the duration of the change between said value at said control input of said power controlling means producing the one and said value producing the other of said power conditions, such that the power condition of said semiconductor power controlling means is gradually changed between one and the other of said power conditions over a period greater than said inherent minimum duration and less than the remaining portion of said half-cycle, whereby the electro-magnetic interference product of said transition is decreased, and wherein the voltage across said lamp load during said transition is controlled to maintain a substantially stable rate of voltage change despite variations in the impedance of said lamp load.

2. Apparatus according to claim 1, including means to sense a value corresponding to instantaneous voltage across said lamp load, an output of said means to sense used as a corrective input to said means for transition control to maintain said substantially stable rate of voltage change.

3. Apparatus according to claim 1, wherein during any half-cycle in which at least one of said transitions will occur, said semiconductor power controlling means is in a substantially non-conductive power condition immediately after the zero-crossing and said transition will be from the substantially non-conductive to substantially conductive power conditions.

4. Apparatus according to claim 2 or 3, wherein said semiconductor power controlling means modulates the instantaneous amplitude of current supplied to said lamp load, and wherein the rate of change of the value at said control input of said power controlling means is varied, whreby the rate of change of instantaneous current is varied during said transition to maintain said substantially stable rate of voltage change.

5. Apparatus according to claim 1, 2, or 3, and further including means non-destructively limit peak current to a value greater than the maximum current required for the normal operation of said lamp load, and less than the value which may cause destruction of said semiconductor power controlling means.

6. Apparatus according to claim 5, wherein said semiconductor power controlling means has a relationship between control input voltage and output current, and wherein said means to non-destructively limit peak current clamps the maximum voltage at said control input at a value within the safe operating region of said control input.

7. Apparatus according to claim 6, wherein said means to non-destructively limit peak current comprises at least one zener diode clamping said control input.

8. Apparatus according to claim 7, and further including means to sense a value corresponding to current passed by said semiconductor power controlling means; means to detect an overcurrent condition responsive to said means to sense a value corresponding to current; and means to cause a transition to non-conduction for at least the remainder of said half-cycle upon detection of said overcurrent condition.

9. Apparatus according to claim 8, wherein said means to non-destructively limit peak current and said means to detect an overcurrent condition have separately determined current limiting thresholds.

10. Apparatus according to claim 8, wherein the duration of said transition in response to an overcurrent condition is less than the duration of a transition under normal condition, and greater than said inherent minimum duration.

11. Apparatus according to claim 5, and further including means to sense a value corresponding to current passed by said semiconductor power controlling means; means to detect an overcurrent condition responsive to said means to sense a value corresponding to current; and means to cause a transition to non-conduction for at least the remainder of said half-cycle upon detection of said overcurrent condition.

12. Apparatus according to claim 11, wherein said means to non-destructively limit peak current and said means to detect an overcurrent condition have separately determined current limiting thresholds.

13. Apparatus according to claim 11, wherein the duration of said transition in response to an overcurrent condition is less than the duration of a transition under normal conditions, and greater than said inherent minimum duration.

14. Apparatus according to claim 1, 2, or 3, and further including means to sense a value corresponding to current; means to detect an overcurrent condition responsive to said means to sense a value corresponding to current; and means to cause a transition to non-conduction for at least the remainder of said half-cycle upon detection of said overcurrent condition, wherein the duration of said transition in response to an overcurrent condition is less than the duration of a transition under normal conditions.

15. Apparatus according to claim 14, wherein the duration of said transition in response to an overcurrent condition is greater than said inherent minimum duration.

* * * * *

UNITED STATES PATENT AND TRADEMARK OFFICE
CERTIFICATE OF CORRECTION

PATENT NO. : 4,633,161

DATED : December 30, 1986

INVENTOR(S) : Michael Callahan, et al.

It is certified that error appears in the above-identified patent and that said Letters Patent is hereby corrected as shown below:

In the Abstract:  Line 13, change "condition" to --conduction--.

Col. 2, line 31, after "will", insert --also--.

Signed and Sealed this

Eighth Day of December, 1987

Attest:

DONALD J. QUIGG

Attesting Officer

Commissioner of Patents and Trademarks